United States Patent
Bick et al.

(10) Patent No.: US 6,725,258 B1
(45) Date of Patent: Apr. 20, 2004

(54) REMOVABLE STORAGE MEDIUM WITH NETWORK ENHANCEMENT AND METHOD OF PRESENTING SAME

(75) Inventors: Eugene K. Bick, Indianapolis, IN (US); Bart R. Voigt, Indianapolis, IN (US)

(73) Assignee: Family Man, Inc., Indianapolis, IN (US)

( * ) Notice: Subject to any disclaimer, the term of this patent is extended or adjusted under 35 U.S.C. 154(b) by 0 days.

(21) Appl. No.: 09/488,243

(22) Filed: Jan. 20, 2000

(51) Int. Cl.[7] .............................................. G06F 15/16
(52) U.S. Cl. ........................ 709/219; 709/217; 709/203
(58) Field of Search ................................ 709/217–219, 709/227–229

(56) References Cited

U.S. PATENT DOCUMENTS

| | | | |
|---|---|---|---|
| 5,359,725 A | * 10/1994 | Garcia et al. | ................ 707/200 |
| 5,467,329 A | 11/1995 | Hashimoto | |
| 5,675,390 A | 10/1997 | Schindler et al. | |

(List continued on next page.)

FOREIGN PATENT DOCUMENTS

| | | |
|---|---|---|
| EP | 0 431 590 A2 | 6/1991 |
| EP | 0 459 157 A2 | 12/1991 |

(List continued on next page.)

OTHER PUBLICATIONS

CD Format Guide, www.arabianknightsfarms.com/vcic/cd-guide.htm, 2 pages.
CD Solutions, CD Solutions, Inc., pp. 1–5.
CD Products, Phillips System Standards & Licensing, 12 pages.
CD Standard Specifications (Yellow/White), Royal Philips Electronics N.V.—System Standards & Licensing, 2 pages.
CD Standard Specifications (Red/Blue), Royal Philips Electronics N.V.—System Standards & Licensing, 1 page.

*Primary Examiner*—Bunjob Jaroenchonwanit
*Assistant Examiner*—Joseph E Avellino
(74) *Attorney, Agent, or Firm*—Bose McKinney & Evans LLP (57) ABSTRACT

A network enhanced, removable storage medium includes content information stored in a format that enables a content player to retrieve and present the content information, a first universal resource locator that identifies a first network resource, first code stored in such a manner that enables a first computing device to automatically invoke execution of the first code in response to the removable medium being received by the first computing device, a second universal resource locator that identifies the location of a second network resource, and second code stored in such a manner that enables a second computing device to automatically invoke execution of the second code in response to the removable storage medium being received by the second computing device. The first code, when executed by the first computing device, causes the first computing device to automatically retrieve the first network resource identified by the universal resource locator, and automatically invoke execution of first content player code that configures the first computing device to present the content information. The second code, when executed by the second computing device, causes the second computing device to automatically retrieve the second network resource identified by the second universal resource locator, and automatically invoke execution of second content player code that configures the second computing device to present the content information.

24 Claims, 3 Drawing Sheets

U.S. PATENT DOCUMENTS

| | | | |
|---|---|---|---|
| 5,679,075 A | 10/1997 | Forrest et al. | |
| 5,682,511 A | 10/1997 | Sposato et al. | |
| 5,695,400 A | 12/1997 | Fennell, Jr. et al. | |
| 5,710,600 A | 1/1998 | Ishii et al. | |
| 5,721,951 A | 2/1998 | DorEl | |
| 5,734,719 A | 3/1998 | Tesvdos et al. | |
| 5,748,763 A | 5/1998 | Rhoads | |
| 5,788,507 A | 8/1998 | Redford et al. | |
| 5,802,492 A | 9/1998 | DeLorme et al. | |
| 5,808,223 A | 9/1998 | Kurakake et al. | |
| 5,841,978 A | 11/1998 | Rhoads | |
| 5,872,850 A | 2/1999 | Klein et al. | |
| 5,909,589 A | 6/1999 | Parker et al. | |
| 5,911,582 A | 6/1999 | Redford et al. | |
| 6,047,292 A * | 4/2000 | Kelly et al. | 709/229 |
| 6,161,132 A * | 12/2000 | Roberts et al. | 709/219 |
| 6,195,693 B1 * | 2/2001 | Berry et al. | 709/219 |

FOREIGN PATENT DOCUMENTS

| | | |
|---|---|---|
| EP | 0 465 246 A2 | 1/1992 |
| EP | 0 529 658 A2 | 3/1993 |
| EP | WO 93/13476 | 7/1993 |
| EP | 0 814 415 A2 | 12/1997 |
| EP | 0 912 058 A2 | 4/1998 |
| EP | 0 851 681 A1 | 7/1998 |
| EP | 0 899 925 A2 | 3/1999 |
| EP | 0 902 381 A2 | 3/1999 |
| EP | 0 913 783 A2 | 5/1999 |
| FR | 2 723 672 | 2/1996 |
| JP | 5-127671 | 5/1993 |
| JP | 5-181753 | 7/1993 |
| JP | 6-231179 | 8/1994 |
| JP | 7-240065 | 9/1995 |
| JP | 7-287877 A | 10/1995 |
| JP | 7-306637 | 11/1995 |
| JP | 8-095668 | 4/1996 |
| JP | 8-287599 | 11/1996 |
| JP | 9-049739 | 2/1997 |
| JP | 9-257501 | 10/1997 |
| JP | 10-162081 | 6/1998 |
| JP | 10-191273 | 7/1998 |
| JP | 10-207898 | 8/1998 |
| JP | 10-240828 | 11/1998 |

* cited by examiner

| Track | Lead-in | Audio | Audio | Lead-out | Lead-in | ROMDATA | ROMDATA | Lead-out |
|---|---|---|---|---|---|---|---|---|
| | | 01 | 02 | | | 03 | 04 | |
| Index | 00 | 01 | 00 | 01 | | 00 | 01 | 00 | 01 | |

Session 1 spans Audio 01 and Audio 02. Session 2 spans ROMDATA 03 and ROMDATA 04.

Lead-in (204) TOC — 2 to 3 sec pre-gap (210)

Audio 01: Audio Content (211), 2 to 3 sec pause (212)

Audio 02: Audio Content (213), 2 to 3 sec pause (214)

Lead-out (206)

Lead-in (208) TOC2 — 2 to 3 sec pre-gap (230)

ROMDATA 03: File System 1 Including URL and Code (231), 2 to 3 sec post-gap (232)

ROMDATA 04: 2 to 3 sec pre-gap (233), File System 2 Including URL and Code (234), 2 to 3 sec post-gap (235)

Lead-out (228)

FIG. 3

REMOVABLE STORAGE MEDIUM WITH NETWORK ENHANCEMENT AND METHOD OF PRESENTING SAME

FIELD OF THE INVENTION

The present invention relates generally to storage media, and more particularly to a network enhanced medium for presenting content.

BACKGROUND OF THE INVENTION

There has been a relatively recent convergence of computer related technologies and typical multimedia distribution technologies. For example, pre-recorded music used to be distributed on vinyl records, 8 tracks, and cassette tapes. These audio distribution mechanisms were very mechanical and stored a representation of the audio signals in an essentially non-encoded analog manner that did not lend itself well to retrieval and playback by personal computing systems. However, pre-recorded music such as a complete album is now being distributed using digital storage media such as compact discs, Sony MiniDiscs, and digital audio tape which store an encoded digital representation of the music. As a result of being stored in a digital format, many personal computing systems include multimedia capabilities which enable the personal computing systems to read the digital storage media and playback the pre-recorded music stored on the digital media.

A similar trend has also occurred in the movie distribution industry. Movies used to be distributed on reels of film and then to the public at large on video cassettes. However, more recently, movies are being distributed upon DVD discs which store the audio and video of a movie in an encoded digital format such as MPEG 2. As a result of being encoded in a digital format, many personal computing systems now include a DVD drive which enables the personal computing system to read the DVD disc and playback the pre-recorded audio and video of the movie stored thereon.

Another trend in the marketplace is associated with the fast growth of Internet usage by consumers and the fast pace by which companies are expanding their presence on the Internet. For most consumers, the personal computing system is their gateway to the wealth of information provided on the Internet; however, other special purpose computing devices such as Microsoft's WebTV are also providing consumers with the tools necessary to access the Internet. Since the devices needed to access the Internet already contain or could be easily modified to contain hardware for retrieving and playing back audio and video content stored on a removable storage medium, companies may be able to increase their Internet presence by enhancing storage media used to store music, movies, and/or other content to also include components which retrieve additional content from the Internet or another network.

A need, therefore, exists for a network enhanced removable storage media and a method of presenting the removable storage media.

SUMMARY OF THE INVENTION

The present invention addresses the above-identified need, as well as others, with a removable storage medium that includes a network enhancement and a method of presenting same. In accordance with one embodiment of the present invention, there is provided an enhanced compact disc. The enhanced compact disc includes a first session and a second session. The first session of the enhanced compact disc includes audio content stored in a format that enables standard audio compact disc players to retrieve and present the audio content. The second session of the enhanced compact disc includes first data accessible by computing devices of a first computing platform. The first data includes a first universal resource locator that identifies the location of a first network resource, and first code stored in such a manner that enables a first computing device of the first computing platform to automatically invoke execution of the first code in response to the enhanced compact disc being received by a first compact disc drive of the first computing device. In particular, the first code when executed by the first computing device causes the first computing device to automatically retrieve the first network resource identified by the first universal resource locator, and automatically invoke execution of first content player code that configures the first computing device to present the audio content of the first session.

Pursuant to another embodiment of the present invention, there is provided a removable storage medium. The removable storage medium includes content information stored in a format that enables a content player to retrieve and present the content information. The removable storage medium also includes a first universal resource locator that identifies the location of a first network resource. Furthermore, the removable storage medium includes first code stored in such a manner that enables a first computing device to automatically invoke execution of the first code in response to the removable medium being received by the first computing device. The first code, when executed by the first computing device, causes the first computing device to automatically retrieve the first network resource identified by the universal resource locator, and automatically invoke execution of first content player code that configures the first computing device to present the content information.

Pursuant to a further embodiment of the present invention, there is provided a method of presenting information. One step of the method includes receiving by a computing device a removable storage medium that includes content information and a universal resource locator that identifies a network resource. Another step of the method includes automatically retrieving via the computing device the network resource identified by the universal resource locator in response to the receiving step. The method also includes the step of automatically presenting via the computing device the content information of the removable storage medium.

Pursuant to yet a further embodiment of the present invention, there is provided a method of presenting information. One step of the method includes receiving by a computing device a removable storage medium that includes content information and a universal resource locator that identifies a network resource. Another step of the method includes automatically retrieving via the computing device a network resource identified by the universal resource locator in response to the receiving step. The method also includes automatically invoking on the computing device execution of code that configures the computing device to present the content information of the removable storage medium.

The above removable storage medium enables numerous types of marketing and business strategies. For example, a company may distribute free audio and or video content which when placed into an appropriate computing device causes the computing device to automatically retrieve a company sponsored web page from the Internet and display the retrieved web page. In this manner, the company can increase the number of times the web page is accessed thus increasing their web presence and their advertising revenue tied to such web page.

The above removable storage medium also enables new artists to distribute promotional CD's containing some of their music. These promotional CD's may be configured to automatically cause an appropriate computing device to retrieve and display a web page that provides additional information about the artist such as future tour dates and additional merchandise associated with the artist.

The above removable storage medium may also be used to market a web site and Internet service provide. It may be used in recruitment programs such as those conducted by colleges and military organizations. It may be used to help facilitate the gathering of information. For example, the removable storage medium may be used to obtain customer feedback information and/or registration information by automatically linking the customer to an web page containing an entry form while playing instructional audio from the removable storage medium that aids the customer in filling out the form.

It is an object of the present invention to provide an improved removable storage medium and a method of presenting same.

It is also an object of the present invention to provide a new and useful removable storage medium and a method of presenting same.

It is another object of the present invention to provide a removable storage medium that is useful in marketing activities.

It is yet another object of the present invention to provide a removable storage medium that is useful in recruitment activities.

It is yet another object of the present invention to provide a removable storage medium that is useful in data collection activities.

It is still a further object of the present invention to provide a removable storage medium that stores content information such as audio tracks in a manner which enable standard content players such as home compact disc players to playback the content information.

It is yet a further object of the present invention to provide a removable storage medium that automates much of the playback process in order to be relatively user friendly.

It is also an object of the present invention to provide a removable storage medium that is accessible to computing devices of different computing platforms.

The above and other objects, features, and advantages of the present invention will become apparent from the following description and the attached drawings.

DESCRIPTION OF THE PREFERRED EMBODIMENTS

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 1:
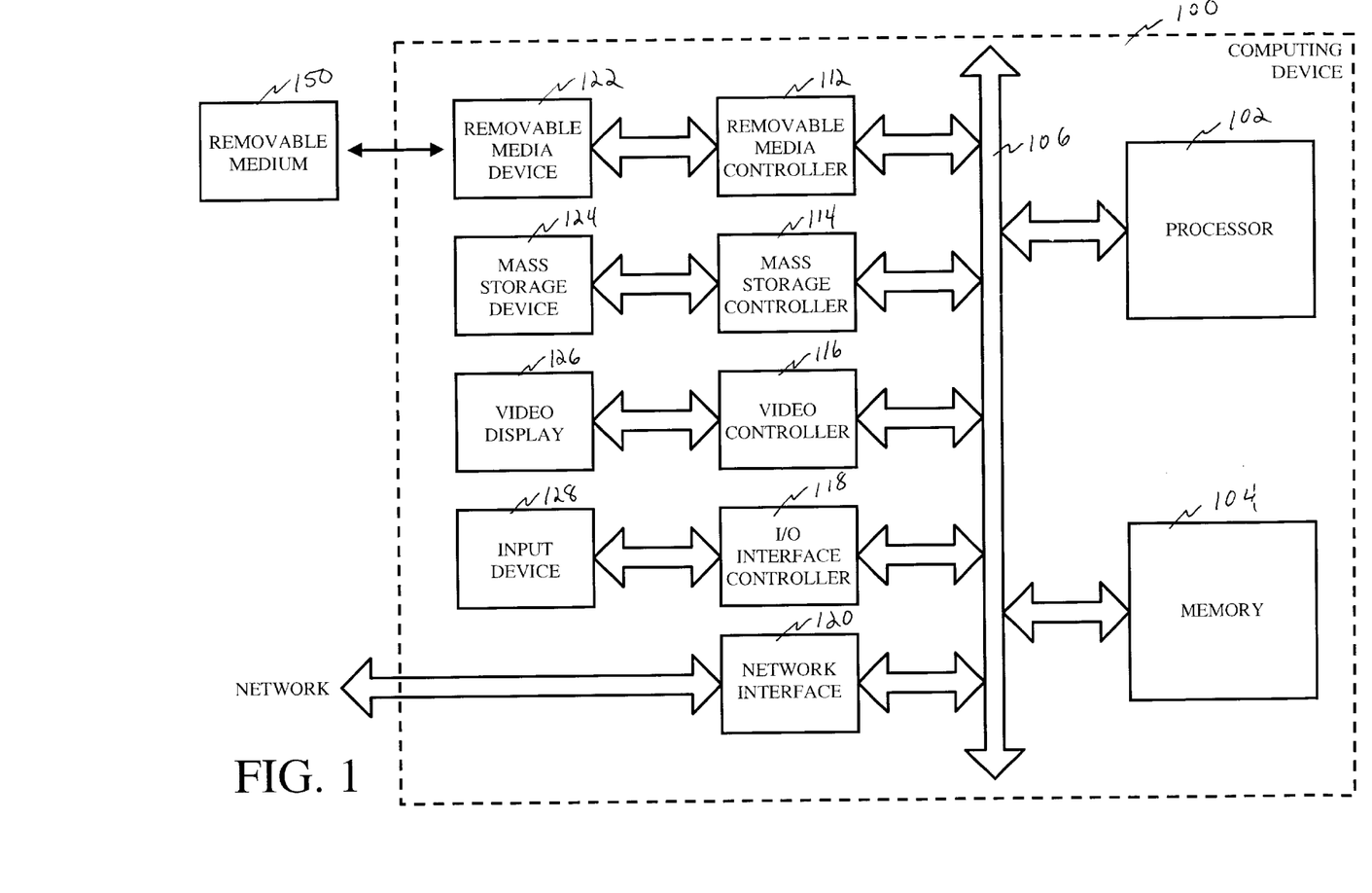
FIG. 1 is a simplified block diagram of an exemplary computing device.

Referring now to FIG. 1, an exemplary computing device 100 suitable for presenting content information on a removable storage medium 150 and automatically executing code from the removable storage medium 150. As illustrated, the exemplary computing device 100 includes a processor 102, memory 104, a system bus 106, controllers 112, 114, 116, 118, network interface 120, and devices 122, 124, 126, 128. The exemplary computing device 100 as depicted in FIG. 1 is generally illustrative of personal computer systems currently manufactured by Gateway, Dell, and Macintosh. While the computing device 100 depicted in FIG. 1 is representative of current personal computer systems, features of the present invention are also envisioned to be used with future special purpose computing devices such as set-top boxes (e.g. Microsoft's WebTV and Tivo, Inc.'s Personal Television System), gaming consoles (e.g. Sega's Dreamcast), and other information appliances with Internet connectivity.

Returning to the description of the exemplary computing device 100, the processor 102 is generally operable to execute software and/or firmware routines stored in the memory 104. As a result of executing the software and/or firmware routines of the memory 104, the processor 102 controls the general operation of the computing device 100 and the devices 122, 124, 126, 128 via the respective controllers 112, 114, 116, 118. Moreover, the processor 102 as a result of executing software and/or firmware routines of the memory 104 is generally operable to cause the exemplary computing device 100 to access content information from the removable storage medium 150 via the removable storage medium device 122, present the content information obtained from the removable storage medium 150, and retrieve a network resource (e.g. web page, text file, audio file, video file, multimedia file, streaming content) identified by a universal network locator ("URL") obtained from the removable storage medium 150.

The memory 104 of the exemplary computing device 100 is operable to store data and code used by the processor 102. To this end, the memory 104, in an exemplary embodiment, includes standard random access memory for storing the data and software code needed by the processor 102. However, the memory 104 may alternatively include other volatile memory types such as DRAM, SDRAM, and SRAM for storing data and software code and/or non-volatile memory such as ROMs, PROMs, EEPROMs, and flash memory for storing data and firmware code.

The system bus 106 is generally operable to interconnect the processor 102, the memory 104, and the controllers 112, 114, 116, 118. To this end, the system bus 106 in the exemplary embodiment includes an address bus and data bus which enable the various components of the exemplary computing device 100 to communicate with one another.

The removable media drive 122 is generally operable to access encoded content information such as textual content, audio content, video content, multimedia content, data and/or software code from the removable storage medium 150, and the removable storage media controller 112 is generally operable to provide the processor 102 with an interface to the removable media drive 122. In an embodiment of the exemplary computing device 100, the removable media drive is a CD-ROM drive that supports access to multi-session CD-ROMs. However, the removable media drive 122 may include various other computer readable and/or writeable removable storage media devices such as floppy disk drives, DVD drives, tape drives such as DAT drives, ZIP drives, Sony MiniDiscs in order to access corresponding types of removable storage media. The removable media drive 122 may also include non-volatile memory interfaces for accessing non-volatile memory devices such as PROMS, EEPROMS, Flash Memory, and Sony Memory Sticks.

The mass storage device 124 is generally operable to store data and/or software code of the exemplary computing device 100, and the mass storage controller 114 is generally operable to provide the processor 102 with an interface to the data and/or software code stored by the mass storage device 118. To this end, the mass storage device 118 may include various computer readable and/or writeable media devices such as hard disk drives, floppy disk drives, CD-ROM drives, DVD-RAM drives, RAID devices, and/or Disk-On Chip devices to name a few. It should be appreciated by those skilled in the art that the exemplary computing device 100 may be implemented without a mass storage device 122 and mass storage controller 112. For example, the exemplary computing device 100 may be implemented with data and firmware code stored in the memory 104 in a non-volatile manner. Many of the special purpose computing devices mentioned above are implemented in such a manner.

The video display device 126 is operable to provide a visual display to a user of the exemplary computing device 100, and the video controller 116 is operable to provide the processor 102 with an interface to the video display device 126. To this end, the video display device 126 may include CRT displays, LCD displays, and/or standard television displays.

The input device 128 is operable to provide a user of the exemplary computing device 100 with an interface to control the operation of the exemplary computing device 100 and/or to provide the exemplary computing device 100 with information. Moreover, the I/O interface controller 118 is operable to provide the processor 102 with an interface to the input device 128. To this end, the input device may include a mouse, keyboard, touch pad, push buttons, and/or touch screen to name a few.

The network interface 120 is generally operable to couple the exemplary computing device 100 to a network such as the Internet, an intranet, and/or an extranet. The network interface 120 generally enables the exemplary computing device 100 to retrieve from the network a network resource such as a web page, a text file, an audio file, a video file, a multimedia file, and/or streaming content. To this end, the network interface 120 may be implemented with a network interface card such as an Ethernet card or Token Ring card. The network interface 120 may also be implemented with an analog modem for use over POTS telephone lines such as a 28.8K or 56K modem. The network interface 120 may also be implemented with a digital modem such as a Cable modem for use over a cable distribution network, an ISDN modem for use over an ISDN telephone line, or a DSL modem for use over a DSL telephone line.

Figure 2:
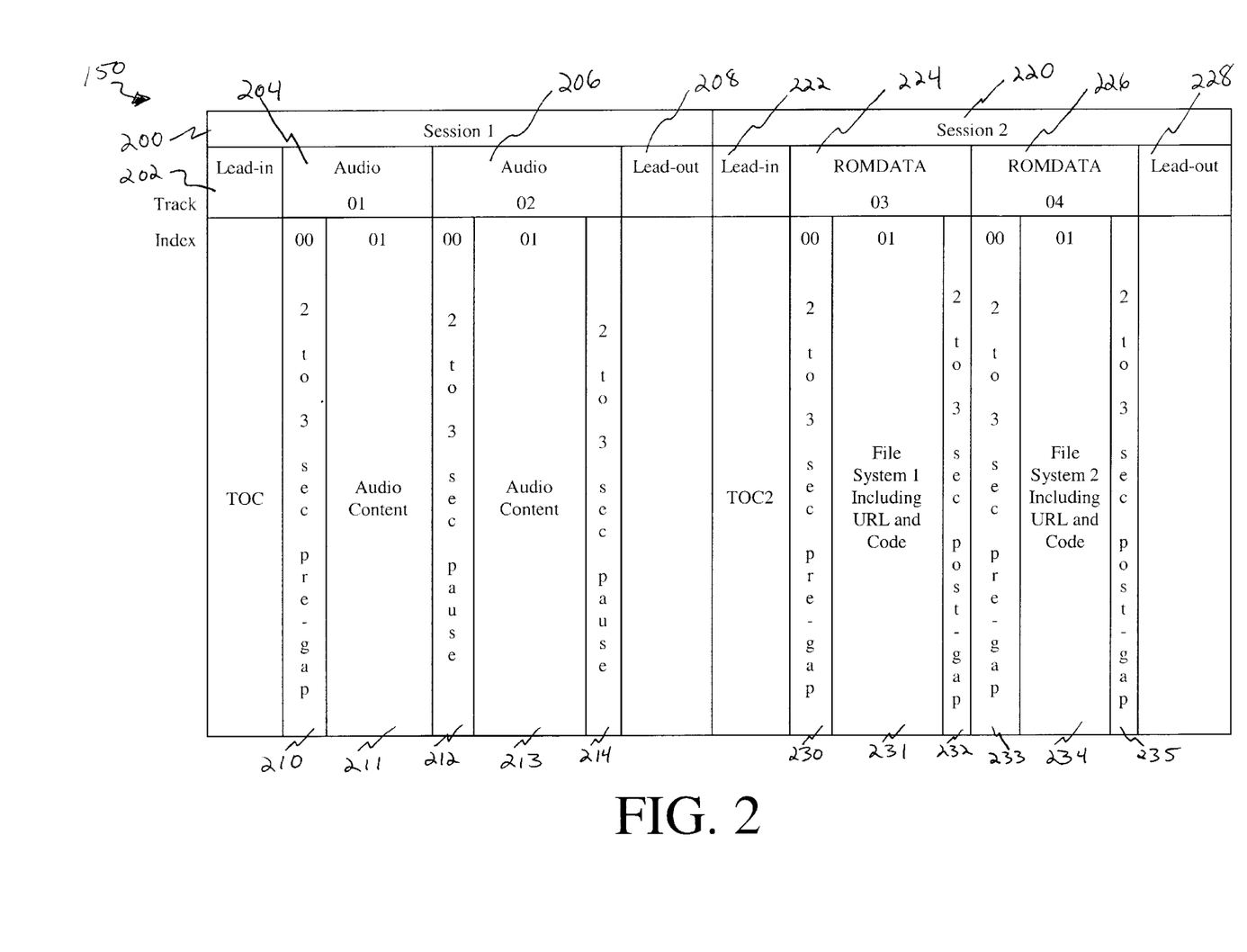
FIG. 2 is a diagram representing the contents of an exemplary removable storage medium for use with the exemplary computing device of FIG. 1.

Referring now to FIG. 2, there is depicted an exemplary format for the removable storage medium 150. In particular, the format depicted in FIG. 2 is particularly suited to a CD-ROM implementation of the removable storage medium 150 and will be described in the context of such a CD-ROM implementation. However, those skilled of ordinary skill in the art should be able to readily adapt similar features of the exemplary format to other media formats without undue experimentation. Moreover, those skilled in the art will readily recognize in light of the following description that the CD-ROM implementation comprises a multi-session CD-ROM format that complies with the Sony/Phillips Yellow Book CD-ROM standard in which a first session includes audio tracks in accord with the Sony/Phillips Red Book CD Digital Audio (CD-DA) standard and a second session includes hybrid read only memory data (ROMDATA) for use with different computing platforms such as PC, MAC, and/or Unix.

As depicted in FIG. 2, the removable storage medium 150 most notably includes content information such as textual content, audio content, video content, and/or other multimedia content and ROMDATA that includes a universal resource locator ("URL"). In particular, the removable storage medium 150 as depicted in FIG. 2 comprises a first session 200 and a second session 220. The first session 200 includes lead-in information 202, a first audio track 204, a second audio track 206, and lead-out information 208. The lead-in information includes table of contents information about information stored in the first session 200. Moreover, the audio tracks 204, 206 include track separation information such as 2 to 3 second pre-gap and/or pause information 210, 212, 214 and: encoded audio content 211, 213. In the exemplary embodiment the audio content 211, 213 is encoded in accord with the Sony/Phillips Red Book CD-DA standard in order to enable standard content players such as home stereo compact disc players, car compact disc players, and portable compact disc players to read and decode the audio content of the audio tracks 204, 206. In other words, the audio content 211, 213 is encoded in such a manner that enables typical compact disc players to play the audio tracks of the removable storage medium 150.

It should be appreciated that while the exemplary embodiment encodes the audio content in accord with the Sony/Phillips Red Book CD-DA standard in order to enable standard compact disc players to play the audio tracks stored on the removable storage medium 150, the content of the removable storage medium 150 may be encoded with other schemes such as MPEG 2 video encoding, MP3 audio encoding, Real Networks Real Audio encoding, Real Networks' Real Video encoding, Liquid Audio encoding, and/or Digital Audio Tape encoding. In particular, the type of content encoding will depend upon the type of content being encoded, the removable storage medium 150 used to store the content, and the content players used to play the content. For example, video may be encoded and stored on a DVD disc using the MPEG 2 video encoding scheme for playback via a standard home DVD player or a computing device with a DVD-ROM drive.

In an exemplary embodiment, the second session 220 is implemented with hybrid data that is accessible by multiple computing platforms. More specifically, the second session 220 is implemented such that the removable storage medium 150 operates similarly in both PC (i.e. Microsoft Windows) and MAC (i.e. Macintosh) computing devices. It should be appreciated that the second session 220 may further be implemented to support other computing platforms such as various Unix computing platforms such as Solaris and Linux computing platforms and/or special purpose computing platforms such as game consoles manufactured by Nintendo, Sony, and Sega.

To this end, the second session 220 in an exemplary embodiment includes lead-in information 222, first ROM- DATA 224, second ROMDATA 226, and lead-out information 228. The lead-in information includes table of contents information about information stored in the second session 220. The ROMDATA 224, 226 include data separation information such as 2 to 3 second pre-gap and/or post-gap information 230, 232, 233, 235. Moreover, the first ROMDATA 224 includes a first file system 231 in which is stored first code and a first URL, and the second ROMDATA 226 includes a second file system 234 in which is stored second code and a second URL.

The first file system 231 in the exemplary embodiment is implemented in accord with the ISO-9660 file system format. Conversely the second file system 234 in the exemplary embodiment is implemented in accord with the Macintosh Hierarchical File System (HFS) format. Current PC systems that utilize one of the available Microsoft Windows operating systems are able to access data stored in the ISO-9660 file system format but ignore data stored in the HFS format. Similarly, current Macintosh computing systems are able to utilize data stored in the HFS format but ignore data stored in the ISO-9660 file system format. Accordingly, from the standpoint of current PC systems that utilize one of the available Windows operating systems, the removable storage medium 150 essentially includes only the first ROMDATA 224. Likewise, from the standpoint of current Macintosh computing systems, the removable storage medium 150 essentially includes only the second ROMDATA 226. Due to the PC systems and Macintosh computing systems recognizing mutually exclusive ROMDATA 224, 226, platform specific code may be placed in the ROMDATA appropriate for each computing platform in order to obtain similar functionality upon computer systems of both the PC and Macintosh platforms.

Figure 3:
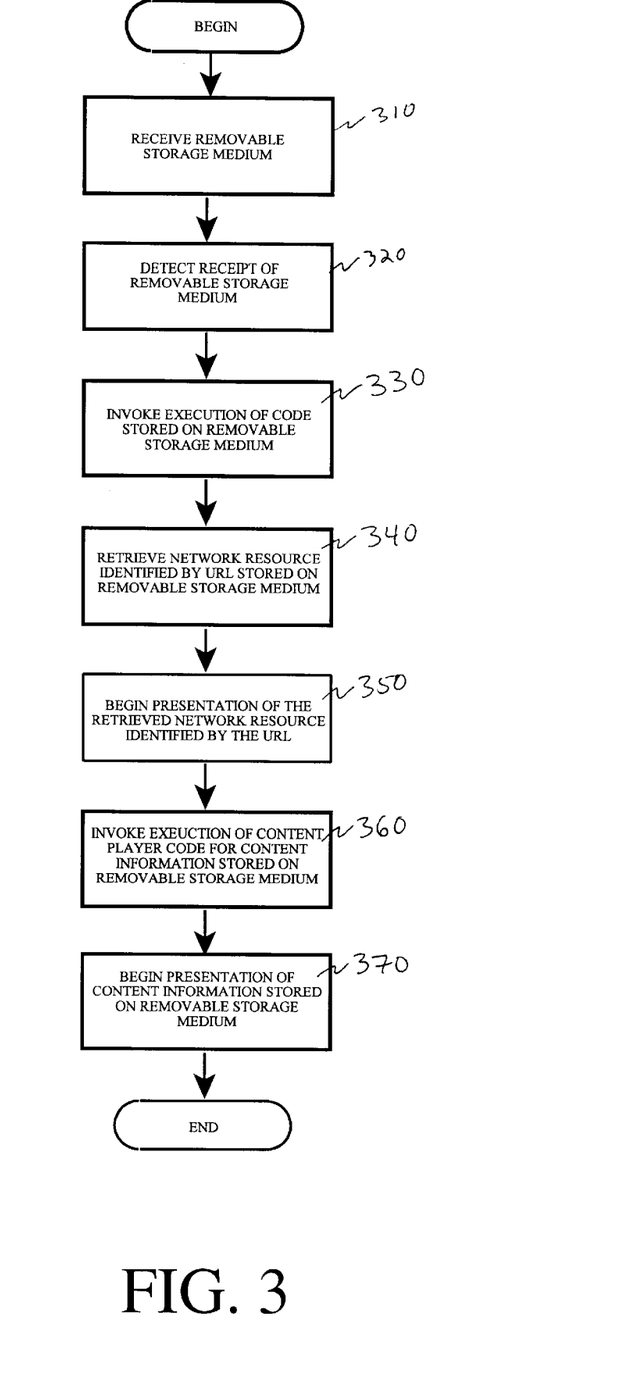
FIG. 3 is a flowchart depicting the operation of the exemplary computing device in response to receiving the exemplary removable storage medium of FIG. 2.

Additional details about the ROMDATA 224, 226 will be discussed in reference to FIG. 3 which illustrates an operational flowchart of the exemplary computing device 100. The following operational description of the exemplary computing device 100 assumes that the computing device 100 is powered on and ready to receive the removable storage medium 150. Moreover, the following describes the operation of the exemplary computing device 100 as sequentially executed steps. However, it should be appreciated that the order of certain steps is not critical and that certain steps may be performed in a different order. Moreover, it should be appreciated that several of the steps in the exemplary computing device 100 are executed in a pseudo-parallel manner thus resulting in the appearance that certain steps are being performed in a parallel or concurrent fashion.

Referring now to step 310, the operation of the exemplary computing device 100 begins with the computing device 100 receiving the removable storage medium 150. The manner by which the computing device 100 receives the removable storage medium 150 depends upon the nature of the removable storage medium 150 but in general includes the insertion of the removable storage medium 150 into an appropriate removable media device 122. For example, step 310 may include a user placing a multi-session CD-ROM into a CD-ROM drive of the exemplary computing device 100, or a user placing a Flash Memory card into a flash memory slot of the exemplary computing device 100.

In response to receiving the removable storage medium 150, the processor 102 of the exemplary computing device 100 in step 320 detects the receipt of the removable storage medium 150. In particular, depending upon the implementation of the removable storage medium, the processor 102 of the exemplary computing device may detect the receipt of the removable storage medium via an interrupt signal generated in response to the removable media device 122 receiving the removable storage medium 150 or via periodic polling of the removable media device 122 via the removable media controller 112.

Upon detecting the receipt of the removable storage medium 150, the processor 102 of the exemplary computing device 100 in step 330 automatically invokes execution of code stored on the removable storage medium 150. In an exemplary Windows PC embodiment of the computing device 100, the processor 102 in accordance with the AutoPlay feature of the Windows operating system invokes execution of platform specific code identified by an AutoPlay configuration file stored in the first file system 231 of the removable storage medium 150. Similarly in an exemplary Macintosh embodiment, the processor 102 in accordance with the AutoLaunch feature of the Macintosh operating system invokes execution of platform specific code identified by an AutoLaunch configuration file stored in the second file system 234. It should be appreciated that the Windows PC embodiment of the exemplary computing device 100, the processor 102 is unable to access the second file system 234 and therefore the platform specific code for Macintosh computing devices due to the second file system 234 having a Macintosh HFS format. Similarly, the processor 102 of the Macintosh embodiment of the exemplary computing device 100 is unable to access the first file system 231 and therefore the platform specific code for Windows PC computing devices due to the first file system 231 having a ISO-9660 file system format. In other words, the file system formats of the first file system 231 and the second file system 234 help to assure that each computing platform executes appropriate platform specific code.

As a result of executing the platform specific code from the appropriate file system 231, 234, the processor 102 causes the computing device 100 in step 340 to retrieve a network resource identified by a URL stored on the removable storage medium. More specifically, execution the platform specific code causes the processor 102 of the computing device 100 to invoke execution of default web browser code (e.g. Microsoft Internet Explorer, Netscape Communicator) and retrieves via the invoked web browser code the network resource identified by the URL. For example, in response to executing the platform specific code, the processor 102 of the exemplary computing device 100 invokes execution of web browser code stored on the mass storage device 124 and retrieves via the invoked web browser code a web page identified by the http://wwwfamilymandt.cotn/URL stored in a file of the appropriate file system 231, 234. It should be appreciated that the URL could also be coded into the platform specific code of the file systems 231, 234. Moreover, the removable storage medium 150 may include a different URL for each computing platform enabling platform specific formats for the URL or platform specific network resources to be identified by the URLs of the removable storage medium 150.

The processor 102 of the exemplary computing device 100 then in step 350 causes the computing device 100 to present the retrieved network resource. Depending upon the nature of the the retrieved network resource, the computing device 100 may display textual content upon the video display 126, display static graphical content upon the video display 126, display moving video content upon the video display 126, play audio content upon audio speakers (not shown), execute code obtained by retrieving the network resource, and/or present the network resource via other mechanisms.

As a result of executing the platform specific code, the processor 102 of the exemplary computing device 100 in step 360 causes the computing device 100 to invoke execution of content player code that configures the computing device 100 to present the content information of the removable storage medium 150. For example, the processor 102 of the exemplary computing device 100 causes the computing device 100 to invoke execution of CD player code that configures the computing device 100 to play audio tracks stored in the first session 200 of the removable storage medium 150. However, depending upon the type of content information of the removable storage medium 150, the platform specific code may alternatively cause the exemplary computing device 100 to invoke execution of content player code for other types of content information. For example, the platform specific code may cause the exemplary computing device 100 to invoke execution of content player code suitable for presenting MPEG 2 video content stored on the removable storage medium 150 or content player code suitable for presenting MP3 audio content stored on the removable storage medium 150.

In step 370, the processor 102 as a result of executing the platform specific code of the removable storage medium 150 causes the exemplary computing device 100 to begin presentation of the content information. For example, if the content information is audio tracks, then the processor 102 in step 370 causes the computing device 100 via content player code to begin decoding the audio tracks stored on the removable storage medium 150 and begin presenting the audible sounds represented by the audio tracks via speakers (not shown).

Moreover, if the content information is MPEG 2 video, then the processor 102 in step 360 causes the computing device 100 via content player code to begin decoding the MPEG 2 video stored on the removable storage medium 150 and begin presenting the video sequence represented by the MPEG 2 video on the video display 126.

It should be appreciated by those skilled in the art that if the content information stored on the removable storage medium is in a format suitable for standard content players then the content information may be presented by such standard content players without the network enhancements that result from retrieving the network resource identified by the URL. For example, if the content information is audio tracks stored and encoded in a first session of a CD in accord with the Sony/Phillips Red Book standard for CD Digital Audio, then the audio tracks may be played by standard home stereo compact disc players, car compact disc players, and portable compact disc players without regard to a network resource identified by a URL stored in the second session of the CD. However, if the same CD is placed in a capable computing device 100, then the computing device 100 may present both the audio tracks of the first session and the network enhancements of the second session.

While the invention has been illustrated and described in detail in the drawings and foregoing description, such illustration and description is to be considered as exemplary and not restrictive in character, it being understood that only exemplary embodiments have been shown and described and that all changes and modifications that come within the spirit of the invention are desired to be protected.

What is claimed is:

1. An enhanced compact disc, comprising:
a first session comprising audio content stored in a format that enables standard audio compact disc players to retrieve and present said audio content; and
a second session comprising first data accessible by computing devices of a first computing platform, said first data comprising
a first universal resource locator that identifies a first network resource, and
first code stored in such a manner that enables a first computing device of said first computing platform to automatically invoke execution of said first code in response to said enhanced compact disc being received by a first compact disc drive of said first computing device, wherein said first code when executed by said first computing device causes said first computing device to
automatically retrieve said first network resource identified by said first universal resource locator, and
automatically invoke execution of first content player code that configures said first computing device to present said audio content of said first session.

2. The enhanced compact disc of claim 1, wherein said second session further comprises second data accessible by computing devices of a second computing platform, said second data comprising:
a second universal resource locator that identifies a second network resource, and
second code stored in such a manner that enables a second computing device of said second computing platform to automatically invoke execution of said second code in response to said enhanced compact disc being received by a second compact disc drive of said second computing device, wherein said second code, when executed by said second computing device causes said second computing device to
automatically retrieve said second network resource identified by said second universal resource locator, and
automatically invoke execution of second content player code that configures said second computing device to present said audio content of said first session.

3. The enhanced compact disc of claim 2, wherein said first data comprising a first file system format that is accessible to computing devices of said first computing platform and that is inaccessible to computing devices of said second computing platform, and said second data comprising a second file system format that is accessible to computing devices of said second computing platform and that is inaccessible to computing devices of said first computing platform.

4. The enhanced compact disc of claim 2, wherein said first data comprises an ISO-9660 file system format, and said second data comprising a Macintosh Hierarchical File System format.

5. The enhanced compact disc of claim 1, wherein said first network resource identified by said universal resource locator is a web page, and said first code when executed by said first computing device causes said first computing device to display said web page identified by said universal resource locator.

6. The enhanced compact disc of claim 1, wherein said first network resource identified by said universal resource locator is a web page, and said first code when executed by said first computing device causes said first computing device to invoke execution of a web browser, and display with said web browser said web page identified by said universal resource locator.

7. The enhanced compact disc of claim 1, wherein said first code comprises said first universal resource locator.

8. The enhanced compact disc of claim 1, wherein said first code when executed by said first computing device causes said first computing device to automatically begin presentation of said audio content.

9. A removable storage medium, comprising:

content information stored in a format that enables a content player to retrieve and present said content information;

a first universal resource locator that identifies a first network resource, and first code stored in such a manner that enables a first computing device to automatically invoke execution of said first code in response to said removable medium being received by said first computing device, wherein said first code when executed by said first computing device causes said first computing device to automatically retrieve said first network resource identified by said universal resource locator, and automatically invoke execution of first content player code that configures said first computing device to present said content information.

10. The removable storage medium of claim 9, wherein said first code when executed by said first computing device causes said first computing device to automatically begin presentation of said content information.

11. The removable storage medium of claim 9, further comprising:

a second universal-resource locator that identifies a second network resource, and second code stored in such a manner that enables a second computing device to automatically invoke execution of said second code in response to said removable storage medium being received by said second computing device, wherein said second code when executed by said second computing device causes said second computing device to automatically retrieve said second network resource identified by said second universal resource locator, and automatically invoke execution of second content player code that configures said second computing device to present said content information.

12. The removable storage medium of claim 11, further comprising:

a first file system having an ISO-9660 file system format, and a second file system having a Macintosh Hierarchical File System format, wherein said first code is stored in said first file system and said second code is stored in said second file system.

13. The removable storage medium of claim 9, further comprising:

a first file system having a first file system format that renders information stored in said first file system accessible to said first computing device and that renders information stored in said first file system inaccessible to said second computing device;

a second file system having a second file system format that renders information stored in said second file system accessible to said second computing device and that renders information stored in said second file system inaccessible to said first computing device, wherein said first code is stored in said first file system and said second code is stored in said second file system.

14. The removable storage medium of claim 9, wherein said first network resource identified by said universal resource locator is a web page, and said first code when executed by said first computing device causes said first computing device to display said web page identified by said universal resource locator.

15. The removable storage medium of claim 9, wherein said content information comprises audio content, and said first content player code when executed by said first computing device configures said first computing device to present said audio content.

16. A method of presenting information, comprising the steps of:

receiving by a computing device a removable storage medium comprising code content information, and a universal resource locator that identifies a network resource;

automatically invoking the code to cause said computing device to retrieve said network resource identified by said universal resource locator in response to said receiving step; and automatically invoking the code to cause said computing device to present said content information of said removable storage medium.

17. The method of claim 16, further comprising the step of displaying a web page obtained in response to said step of automatically invoking the code to cause said computing device to retrieve said network resource identified by said universal locator, wherein said step of automatically invoking the code to cause said computing device to present said content information comprises the step of decoding digital audio data of said content information that is stored in Red Book format.

18. A method of presenting information, comprising the steps of:

receiving into a computing device a removable storage medium comprising code content information, and a universal resource locator that identifies a network resource;

automatically invoking the code to cause said computing device to retrieve a network resource identified by said universal resource locator in response to said receiving step: and automatically invoking the code on said computing device to cause the configuring of said computing device to present said content information of said removable storage medium.

19. The method of claim 18, further comprising the step of displaying a web page obtained in response to said step of invoking the code to cause said computing device to retrieve said network resource identified by said universal locator.

20. The method of claim 18, wherein said step of invoking the code on said computing deice so as to cause the configuring of said computing device to present said content information comprises the step of:

decoding digital audio data of said content information that is stored in Red Book format.

21. An enhanced compact disc, comprising:

a first session comprising audio content stored in a format that enables standard audio compact disc players to retrieve and present the audio content; and a second session comprising first data stored in a first file format accessible by computing devices of a first computing platform, the first data comprising first code that enables a first computing device of the first computing platform to execute the first code wherein the first code when executed by the first computing device allows the first computing device to access and present the audio content of the first session, the second session further comprising second data stored in a second file format accessible by computing devices of a second computing platform, the second data comprising second code stored that enables a second computing device of the second computing platform to execute the second code wherein the second code, when executed by the second computing device allows the second computing device to access and present to audio content of the first session.

22. The enhanced compact disc of claim 21, wherein the first file format is an ISO-9660 file system format, and the second file format is a Macintosh Hierarchical File System format.

23. The enhanced compact disc of claim 21, wherein the first and second data of second session when executed by the first and second computing devices respectively cause the presentation of a network resource identified by a Universal Resource Locator contained within the first and second data.

24. An enhanced compact disc, comprising:

a first data area containing data; and a second data area comprising first code stored in a first file format accessible by computing devices of a first computing platform, the first code comprising code that enables a first computing device of the first computing platform to utilize the data in the first data area, the second data area further comprising second code stored in a second file format accessible by computing devices of a second computing platform, the second code comprising code that enables a second computing device of the second computing platform to execute to utilize the data in the first data area.

\* \* \* \* \*